(12) United States Patent
Meiner

(10) Patent No.: US 12,600,566 B2
(45) Date of Patent: Apr. 14, 2026

(54) PALLET TRANSPORT MEANS

(71) Applicant: Deutsche Post AG, Bonn (DE)

(72) Inventor: Hendrik Meiner, Leipzig (DE)

(73) Assignee: Deutsche Post AG, Bonn (DE)

( * ) Notice: Subject to any disclaimer, the term of this patent is extended or adjusted under 35 U.S.C. 154(b) by 458 days.

(21) Appl. No.: 18/191,260

(22) Filed: Mar. 28, 2023

(65) Prior Publication Data

US 2023/0312245 A1 Oct. 5, 2023

(30) Foreign Application Priority Data

Mar. 29, 2022 (DE) ..................... 10 2022 107 414.5

(51) Int. Cl.
*B65G 1/04* (2006.01)
*B65G 1/06* (2006.01)
(52) U.S. Cl.
CPC ............. *B65G 1/0478* (2013.01); *B65G 1/06* (2013.01); *B65G 2201/0267* (2013.01)
(58) Field of Classification Search
CPC ............................ B65G 69/001; B65G 69/003; B65G 47/5154; B65G 37/005; B65G 65/00; B65G 1/0478; B65G 1/07; B65G 2201/0267; A21C 15/00; B65H 33/16; B65H 29/6645; B65H 29/6634; B65H 29/34; B66F 3/46; B66F 7/20; B66F 7/04; B66F 7/22; B65D 9/143; B65D 19/44; B65D 90/0053; B65D 88/54; B65D 88/542; B65D 2519/0081; B65D 2519/00323; B65D 2519/00059; B65D 2519/00616;

B65D 2519/00701; B65D 2519/00805; B65D 2519/00164; B65D 2519/00666; B65D 2519/00333; B65D 2519/00288; B65D 2519/00024; B65D 2519/00174; B65D 2519/00716;

(Continued)

(56) References Cited

U.S. PATENT DOCUMENTS 3,552,761 A 1/1971 Sjoblom
3,926,299 A * 12/1975 Bradley ................. B65G 65/00
414/800

(Continued)

FOREIGN PATENT DOCUMENTS

CA 2215759 3/1999
CN 109823849 A 5/2019
(Continued)

OTHER PUBLICATIONS

Office Action for corresponding German Application No. 102022107414.5, dated Oct. 24, 2022, 6 pages.

(Continued)

*Primary Examiner* — Glenn F Myers
(74) *Attorney, Agent, or Firm* — Dority & Manning, P.A.

(57) ABSTRACT

A pallet transport means for transporting a plurality of pallets includes a base frame configured to receive the plurality of pallets, and at least two lifting units arranged oppositely on the base frame. Each lifting unit has a plurality of spaced apart brackets which are connected to one another and which are configured in each case to receive a respective pallet in pairs in an opposite manner, and can be moved on one hand orthogonally and on the other hand parallel in relation to the base frame.

13 Claims, 3 Drawing Sheets

(58) Field of Classification Search
CPC ........... B65D 2519/00293; B65D 2519/00273; B60P 1/6427
See application file for complete search history.

(56) References Cited

U.S. PATENT DOCUMENTS

| | | | | |
|---|---|---|---|---|
| 9,022,717 | B2 * | 5/2015 | Liu .................... | H01L 21/67259 |
| | | | | 414/331.04 |
| 11,299,348 | B1 * | 4/2022 | Bhardwaj ............ | B65G 59/063 |
| 11,420,823 | B1 * | 8/2022 | Mehta .................... | B65G 47/50 |
| 2004/0040477 | A1 | 3/2004 | Neumann | |
| 2011/0203622 | A1 * | 8/2011 | Buck ....................... | B65D 19/38 |
| | | | | 134/198 |
| 2015/0107964 | A1 * | 4/2015 | Zhang .................. | B65G 37/005 |
| | | | | 198/620 |
| 2019/0270601 | A1 * | 9/2019 | Kim .................. | H01L 21/67346 |

FOREIGN PATENT DOCUMENTS

| | | | |
|---|---|---|---|
| CN | 110626805 | A | 12/2019 |
| CN | 214691309 | U | 11/2021 |
| DE | 1917833 | | 1/1970 |
| DE | 10251090 | A1 | 5/2003 |
| DE | 102019126427 | B3 | 2/2021 |
| JP | H 07315577 | A | 12/1995 |

OTHER PUBLICATIONS

Extended European Search Report (with English translation) for Application No. EP 23163726.5, dated Aug. 3, 2023, 17 pages.

* cited by examiner

PALLET TRANSPORT MEANS

CROSS-REFERENCE TO RELATED APPLICATIONS

The present application is based upon and claims the right of priority to German Patent Application Number 10 2022 107 414.5, filed Mar. 29, 2022, the disclosure of which is hereby incorporated by reference herein in its entirety for all purposes.

TECHNICAL FIELD

The invention relates to a pallet transport means for transporting a plurality of pallets, having a base frame configured to receive the plurality of pallets.

BACKGROUND OF THE INVENTION

So-called pallet transport means are known from the prior art and serve to store and transport single pallets or a plurality of pallets stacked on top of one another. Such pallet transport means can be moved between different locations on one hand manually by means of a drawbar or on the other hand in a motorized manner. A pallet is generally understood as a flat construction which can be manufactured from wood, metal or plastic. Goods or single items which can be transported by means of the pallet can be placed on the pallet.

In the field of air freight, so-called Unit Load Devices, ULDs, are used as pallets to load luggage, freight and/or shipments into aircraft. For the purpose of weight optimization, such pallets are generally manufactured from aluminum plate with a lower frame composed of profiles, wherein freight nets to secure the luggage, freight and/or shipments placed on the pallet can often be mounted in edges of the lower frame.

Empty pallets are moved between different locations, for example, a terminal and an aircraft parked on an airfield, either individually or stacked on top of one another on pallet transport means described above, wherein, however, both variants are not optimal. Individual transport of a pallet with a so-called dolly is of course time-consuming. The pallets can generally only be stacked on top of one another by means of electromotively operated devices such as forklift trucks or the like, wherein the stack must be secured against slipping in a manual and thus time-consuming manner. The individual pallets are furthermore not uncommonly damaged during loading or unloading, which can lead to potential accidents involving personnel.

DESCRIPTION OF THE INVENTION

Proceeding from this situation, one object of the present invention is to indicate an improved pallet transport means and a corresponding method in order to be able to transport a plurality of pallets in a simple and secure manner.

The object of the invention is achieved by the features of the independent claims. Advantageous configurations are indicated in the subordinate claims.

The object is accordingly achieved by a pallet transport means for transporting a plurality of pallets, having a base frame configured to receive the plurality of pallets, and at least two lifting units arranged oppositely on the base frame, wherein each lifting unit has a plurality of spaced apart brackets which are connected to one another and which are configured in each case to receive a respective pallet in pairs in an opposite manner, and can be moved on one hand orthogonally and on the other hand parallel in relation to the base frame.

One key point of the invention lies in the fact that on one hand a plurality of pallets can be safely transported by means of the proposed pallet transport means and on the other hand the pallets can be loaded individually in a simple manner onto the pallet transport means and unloaded from it. This is because the pallets can be stored individually and spaced apart on the pallet transport means by means of the movable brackets of the lifting units. In other words, it is ensured by the spaced apart storage that the pallets are not damaged during transport, loading and unloading, as is often the case with the pallet transport means known from the prior art.

In the case of an exemplary loading of the pallet transport means, a first pallet can firstly be placed on the base frame, in particular pushed onto the base frame. By moving a pair of oppositely arranged first brackets orthogonally away from the base frame, the first pallet can be lifted up so that a second pallet can be placed on the base frame. By further movement of the oppositely arranged brackets orthogonally further away from the base frame, both the pair of first brackets with the first pallet and a pair of second brackets spaced apart therefrom, on which the second pallet comes to lie, are lifted up so that a third pallet can be placed on the base frame. In an analogous manner, the approach can be taken during unloading that the pallets can be unloaded one by one from the pallet transport means by lowering the brackets. In a retracted state, the brackets are preferably arranged within the base frame having, for example a base plate and can be retracted and extended. Loading and unloading can be performed with a device for accurate positioning of a transport pallet as described in the German patent application with the publication number 10 2019 126 427. The base plate can generate a height difference as a result of internal brackets. Ramps on the base plate can assist a positioning of the pallets on the base plate. The ramps can be folded up at corners or integrated in the base plate and pulled out during loading and unloading. The ramps are preferably configured to ensure greater freedom of movement in the horizontal plane, for example, by a ball joint or the like after folding down and/or pulling out. A damping and/or flexible element for preventing damage in the event of a collision of the pallet with the pallet transport means can be provided in the region of a ramp suspension.

The pallet transport means can be configured as a trailer, in particular with a towbar for manual movement and/or coupling to a towing vehicle. The pallet transport means can likewise be motorized, for example, have a combustion engine and/or an electric motor with a corresponding battery. Of course, a plurality of wheels or rollers by means of which the pallet transport means can likewise be moved as on a castor deck can be provided on an underside of the base frame. The pallet transport means is preferably configured for transporting 3, 4, 5, 6, 7, 8, 9, 10 or more pallets. The base frame preferably has a rectangular, in particular square shape. The lifting units are preferably provided on longitudinal sides of the base frame. A plurality of lifting units are preferably arranged on each longitudinal side and/or the lifting units are configured in a terminal-like manner, for example, from a metal profile and/or having a terminal with respect to which the brackets can be moved. The lifting units preferably extend on an upper side of the base frame orthogonally away therefrom. During transport, securing elements can bring about a securing of the pallets on the base frame. The securing is preferably actuated shortly before the start of transport. In the case of actuation, for example, by a rotary mechanism, the securing elements can be positioned, for example, in the form of U-profiles or flat plates between spaced apart pallets. The securing elements can be attached to a vertically rotatable rod and/or are preferably configured in accordance with the requirements of the IATA—Airport Handling Manual, AHM. Manual actuation can be performed with a fixedly attached handle. The plates provided with a hinge can likewise be positioned below the pallets to be secured in each case and spaced apart by a folding mechanism.

The brackets can in principle be configured as desired to receive the respective pallet. For example, the brackets can have bent lug link plates by which the pallet can be received. It is also conceivable that the brackets are configured by rotated U-profiles into which the pallet can be pushed. The brackets can be arranged at a spacing of, for example, 100, 200, 300 or 500 mm. The term in pairs in an opposite manner means in particular that a bracket receives the pallet on one side and the other bracket receives the pallet on the opposite side. In the case of the U-profiles, if after a loading sequence the pallet is introduced onto the base frame, the U-profiles are preferably aligned until the pallet lies in the U-profile so that the lifting process can be completed.

The brackets are preferably movable relative to the lifting unit. In the extended position, for example, if all the brackets have received a pallet, the brackets can only extend in the orthogonal direction, while the brackets in the retracted position can only in general extend parallel in relation to the base frame. In this regard, movable on one hand orthogonally and on the other hand parallel in relation to the base frame means in particular that the brackets are movable, for example, between the extended position and the retracted position about an orthogonally curved movement path. In relation to the base frame means in particular in relation to a base surface and/or surface of the base frame. The base frame is preferably configured flat on its upper side.

According to one preferred further development, each lifting unit has a chain hoist or a belt on which the brackets are provided, which chain hoist or belt can be moved on one hand orthogonally and on the other hand parallel in relation to the base frame. The chain hoist can be configured as a chain to which the brackets are attached by means of bent lug link plates. The chain hoist is preferably movable relative to the terminal or to the lifting unit and parallel to the base surface of the base frame.

According to another preferred configuration, the brackets within the base frame or within a top frame arranged orthogonally in relation to the base frame and spaced apart therefrom can be moved parallel in relation to the base frame. In this manner, the brackets, in particular in the retracted or at least partially retracted position, can be provided in the base frame or the top frame so that, for example, only brackets occupied with pallets project out of the base frame or the top frame.

According to a yet further preferred further development, the pallet transport means has an electromotive and/or hydraulic drive provided within the base frame or within a top frame arranged orthogonally in relation to the base frame and spaced apart therefrom, which drive is configured to synchronously move the brackets connected to one another of the lifting units arranged oppositely in relation to the base frame. The drive can be connected to the chain hoist or the belt by means of a cable, wherein the chain hoist or the belt can likewise be suspended directly on the drive, for example, a hydraulic strut. The chain hoist or the belt can be connected to the drive by means of a deflection roller. Insofar as the drive is provided within the base frame, two deflection rollers can be provided which are provided at the upper and lower end of the lifting unit or the terminal. Insofar as the drive is provided within the top frame, a roller can be provided at the upper end of the lifting unit or the terminal. Insofar as the drive is movable parallel to the base surface, the lifting unit of one side can be linked via a further deflection roller to the drive. Alternatively, the drive can be configured as a manual drive. The drive preferably has, however, a battery so that movement of the brackets or pallets is possible irrespective of location, for example, on an airfield apron. The electromotive drive can obtain a charging of a battery via a PV system which is preferably provided above the base frame.

According to one preferred configuration, the base frame is configured to be rectangular and has four lifting units, wherein in each case two lifting units are arranged spaced apart on one side of the base frame. Three, four or more lifting units can likewise be provided on the opposite sides. In each case one of the two lifting units is preferably assigned to a corner of the base frame. The lifting units are preferably arranged and/or dimensioned on the base frame in relation to the size of the pallets in such a manner that the brackets can raise and/or lower the pallets.

According to a further preferred configuration, the lifting units are arranged pivotably on the base frame. The lifting units are preferably connected to the base frame via a joint provided on a lower edge and in such a manner can be pivoted away from the base surface.

In yet another preferred further development, the brackets are configured to engage under the respective pallet for movement thereof. The brackets are preferably configured to be L-shaped in their position on the lifting units, wherein the lower, horizontal part serves to engage under the pallet and the upper, orthogonal part is connected to the chain hoist or the belt. The lower part can be configured to be pivotable so that it can be pivoted onto the upper part in a space-saving manner. In addition, further configurations of the brackets are conceivable, for example, in the form of a U-profile opened towards the pallet. The brackets assigned to a pallet are preferably moved synchronously, i.e. simultaneously in particular by the drive so that the pallet always remains in the same plane during movement.

According to one preferred configuration, the base frame has a plurality of rollers provided on the base frame, via which rollers the respective pallet can be rolled onto the base frame. The rollers are preferably configured as ball rollers. The rollers are particularly preferably arranged at regular intervals in the pushing-in direction on the base frame or the base surface. A plurality of such rows of rollers are preferably arranged at a spacing to one another. Such rows of rollers can likewise only be provided on the edges adjacent to the lifting units. The rollers can be electrically driven in a specific direction of travel of the pallet.

The base frame can be configured to be circumferentially open. The base frame is preferably laterally delimited by wall elements which are opened at the front side by an opening for loading and unloading the pallet transport means with the pallets. The wall elements, like a likewise possible top element, can be configured from plexiglass, plastic or metal. The base frame is preferably configured from metal. The base frame can furthermore be configured to transport different types of pallets with identical dimensions in the case of the longitudinal sides and different dimensions in the case of the face sides. Varietally pure transport is preferably performed. In the case of different dimensions in the case of the face sides, shorter widths can be secured with a locking device.

The object of the invention is furthermore achieved by an arrangement comprising a pallet transport means as described above and the plurality of pallets, wherein the pallets are received in each case by two brackets and are arranged orthogonally in relation to the base frame and spaced apart from one another. The pallets are preferably received on opposite sides by at least two brackets, in particular in each case two spaced apart brackets on each side. The base frame can, as described above, receive pallets of the same length and different width for a complete loading and unloading process. During lifting and transporting, the pallets are expediently secured with a stop device.

According to a preferred further development, the pallets are configured in each case as a Unit Load Device pallet or as an air cargo pallet. The term Unit Load Device, in short ULD, generally refers to pallets or air freight pallets by means of which luggage, freight material and/or packages, in particular postal packages, can be loaded into aircraft, wide-bodied aircraft and narrow-bodied aircraft. ULDs or general air freight pallets make it possible that large amounts of cargo can be bundled into large units and in such a manner easily and quickly loaded into and out of the aircraft, which saves time and cost. The pallets and/or the ULD pallets are preferably configured as pallets composed of aluminum plate, in particular with a lower frame composed of profiles, the edges of which can be configured such that loops of cargo-securing freight nets can be latched into the lower frame. The pallets and/or the ULD pallets can likewise be configured from plastic or a composite material. The dimensions of the ULD pallets are typically indicated in inches, and are, for example, 88×125 inches, 96×125 inches or 96×238 inches.

According to another preferred further development, the pallets correspond to the base frame in terms of their extent. The base surface of the base frame preferably corresponds to the pallets, is in particular embodied to be in particular identical or approximately identical. In this regard, the brackets or the lifting units can preferably be dimensioned in such a manner and/or arranged on the base frame that a pallet placed onto the base frame can be raised or lowered by means of the brackets. In principle, the proposed solution assumes that the pallets are empty, i.e. no luggage, freight material and/or packages are arranged on the pallets. It is, however, conceivable that the pallet transport means, in the case of corresponding dimensioning, in particular the height of the pallet transport means, can be used to transport loaded pallets. For example, a pallet can in this manner be secured and transported with a freight-securing device such as, for example, belts, foils or the like, within the pallet transport means.

The object of the invention is furthermore achieved by a method for transporting a plurality of pallets with a pallet transport means having a base frame configured for receiving the plurality of pallets, and at least two lifting units arranged oppositely on the base frame, wherein each lifting unit has a plurality of spaced apart brackets which are connected to one another and which are configured in each case to receive a respective pallet in pairs in an opposite manner, and with the step:

for orthogonal movement of the pallets within the pallet transport means, moving the brackets on one hand orthogonally and on the other hand parallel in relation to the base frame.

As a result of the proposed method, a plurality of pallets can be loaded consecutively onto the pallet transport means and in turn unloaded from it, wherein the pallets can be stacked on top of one another in such a manner in the pallet transport means by means of the brackets that the pallets do not touch. As a result of this, damage to the pallets is avoided on one hand during transport of the pallets and during loading and unloading of the pallets in and out of the pallet transport means.

According to a preferred further development, the method has the step:

pushing-in a pallet onto the base frame, moving the pushed-in pallet orthogonally in relation to the base frame upwards away from it, pushing-in a further pallet onto the base frame, and moving the further pallet including the pallet already moved.

The plurality of pallets can be placed successively one after the other onto the base frame or pushed onto it, which plates are raised in each case consecutively by at least two brackets until all the plates are stored in the pallet transport means. The pallet transport means can be unloaded in an analogous manner.

Further configurations and advantages of the method will become apparent for the person skilled in the art in analogy to the pallet transport means described above.

BRIEF DESCRIPTION OF THE DRAWINGS

The invention is explained in greater detail below with reference to the enclosed drawings on the basis of preferred exemplary embodiments.

In the drawings

DETAILED DESCRIPTION OF THE EXEMPLARY EMBODIMENTS

Figure 1:
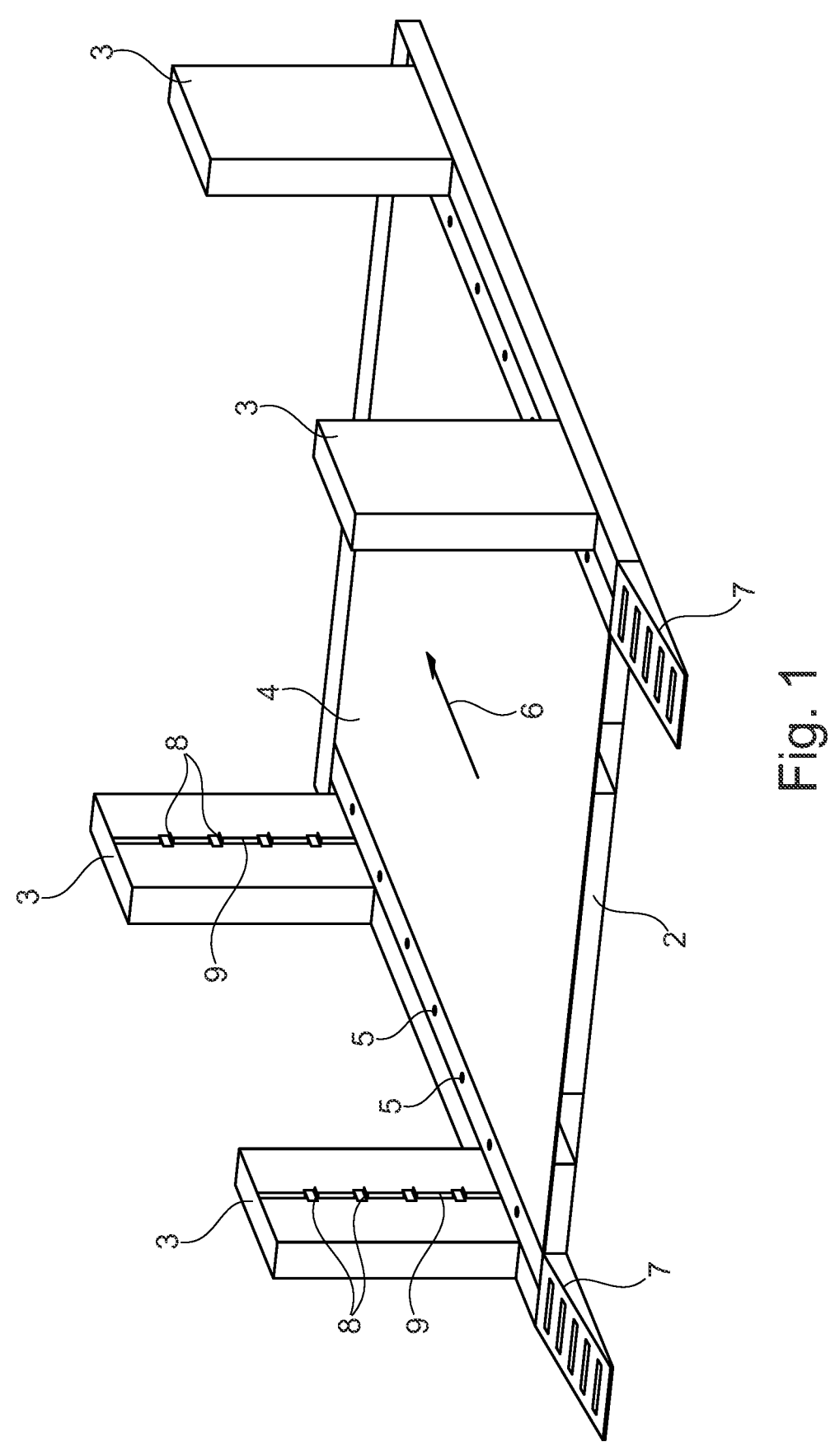
FIG. 1 shows a pallet transport means for transporting a plurality of pallets in a perspective view according to a preferred exemplary embodiment of the invention.

FIG. 1 shows a pallet transport means for transporting a plurality of pallets 1 in a perspective view according to a preferred exemplary embodiment of the invention. The pallet transport means has a rectangular base frame 2 for receiving the plurality of pallets 1. The base frame 2 has a flat surface composed of aluminum plate with a lower construction composed of aluminum profiles. Rollers, not shown, are provided on a lower side of the base frame 2 so that the pallet transport means can be moved by means of a towbar, also not shown. Alternatively, the base frame can have a flat underside so that the base frame can be moved over rollers or balls integrated into the floor, for example, in the form of a so-called "Castor Deck".

In each case two lifting units 3 which are arranged spaced apart from one another are provided on both longitudinal sides of the base frame 2 so that a respective lifting unit 3 is assigned to a respective corner of the base frame 2. The lifting units 3 extend from the surface of the base frame 2 orthogonally away upwards and form in such a manner terminal-like structures composed of a rectangular profile. A bearing surface 4 of the base frame 2 is formed by the lifting units 3.

Several parallel rows with ball rollers 5 arranged spaced apart extend on the bearing surface 4. FIG. 1 shows two rows which extend respectively adjacent to the lifting units 3 in the pushing-in direction 6 of the pallet 1 onto the bearing surface 4 in the drawing plane of FIG. 1 from front left to rear right with ball rollers 5 arranged spaced apart. Further rows, not shown in FIG. 1, with ball rollers 5 arranged spaced apart can also be provided which extend parallel to the rows shown.

A respective pallet 1 can be pushed in onto the bearing surface 4 by means of the ball rollers until the respective pallet 1 comes to lie on the bearing surface 4 framed on opposite sides by the lifting units 3. Opposing ramps 7 are provided on the front transverse side of the base frame 2 in elongation of the rows with the ball rollers 5 arranged spaced apart in order to facilitate the pushing-in of the respective pallet 1 onto the bearing surface 4.

Each lifting unit 3 has a plurality of brackets 8 by which a respective pallet 1 can be received at its opposite edges. The brackets 8 in the form of bent lug link plates of each lifting unit 3 are arranged fixedly on a chain 9 with a breaking force of 60 kN at a distance of 200 mm, which, as is apparent in FIG. 1, extends upwards in each case from the bearing surface 4 orthogonally away from this at the terminal of the respective lifting unit 3.

A lower deflection roller 10 only shown in a rudimentary form which deflects the chain 9 into the base frame 2 is provided in the base of the terminal of the respective lifting unit 3 so that the chain 9 likewise runs parallel to the bearing surface 4 and orthogonally to the pushing-in direction 6. The brackets 8 fastened to the chain 9 are movable by means of the respective chain 9 on one hand orthogonally and on the other hand parallel in relation to the base frame 2. The chain 9 can be connected to a spring within the base frame. Instead of the chain 9, a belt can likewise be provided on which the brackets 8 are arranged in a spaced apart manner.

The brackets 8 are configured as foldable bearing brackets and have a holding part which is fastened to the chain and which extends parallel thereto, as well as a foldable receiving part for the pallet 1. The receiving part extends, in the folded-in position, parallel to the holding part and, in the folded-out position, orthogonally to the holding part. The receiving part, in the folded-out position shown in FIG. 2 at the lifting unit 3, correspondingly extends parallel to the bearing surface 4 so that the bracket 8 can engage under a pallet 1 at its edge.

Figure 2:
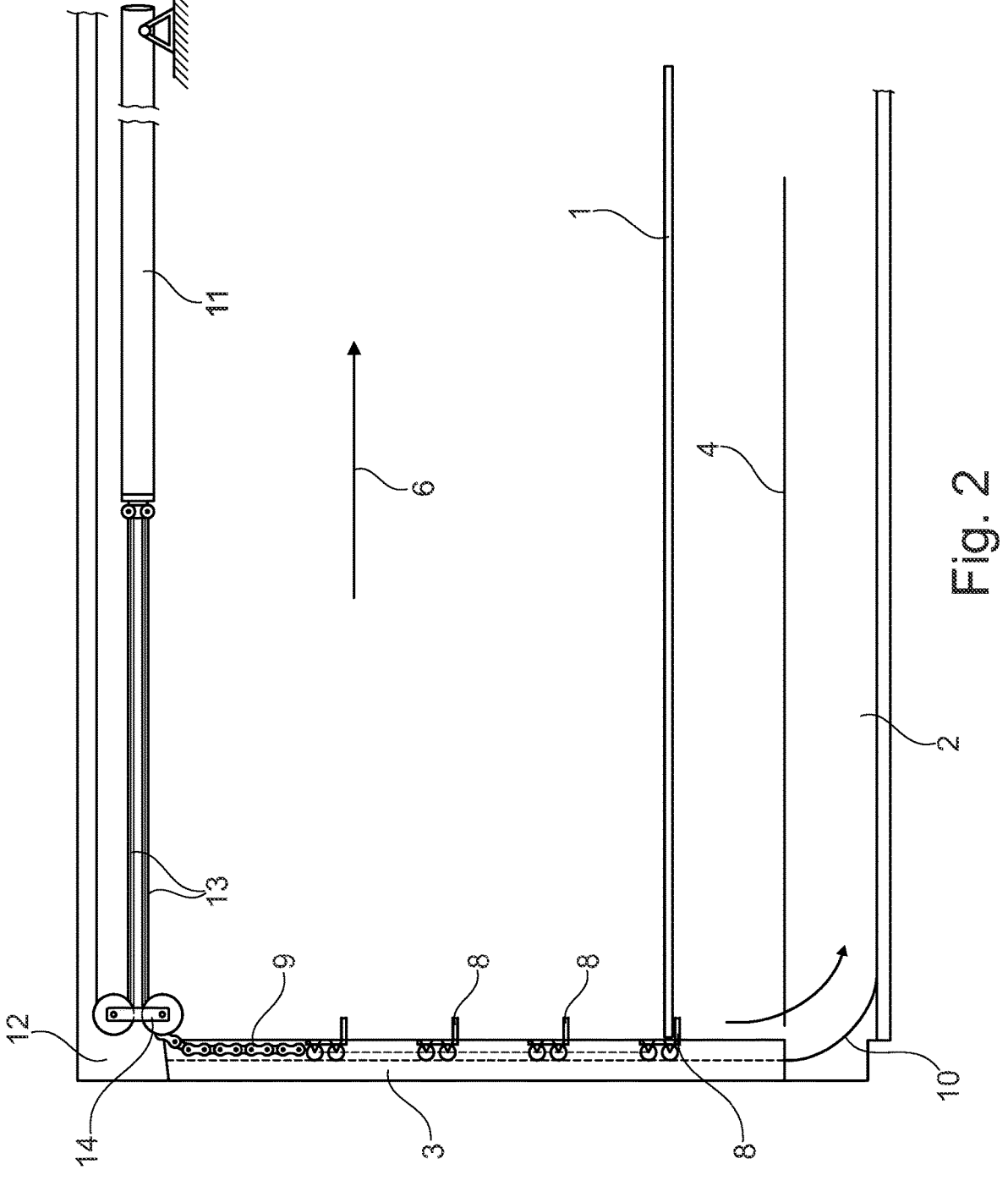
FIG. 2 shows the pallet transport means according to FIG. 1 in a side view according to a further preferred exemplary embodiment of the invention.

Insofar as a pallet 1 is thus placed onto the bearing surface 4, the pallet 1 can be raised into the position shown in FIG. 2 by simultaneous movement of all four chains 9 upwards away from the bearing surface 4. The bearing surface 4 becomes free so that a further pallet 1 can be placed onto the bearing surface 4. Both pallets 1 are raised by further movement of the four chains 9 upwards so that a yet further pallet can be placed onto the bearing surface 4. With the configuration shown in FIG. 2 with in each case five brackets 8, a total of six pallets 1 can be arranged spaced apart and on top of one another in the pallet transport means and be moved jointly. If no pallets 1 are stored in the pallet transport means, the entire chain 9 can be retracted with all the brackets 8 fully into the base frame 2.

An electromotive and/or hydraulic drive 11 which is either arranged within the base frame 2, as shown in FIG. 1, or can be provided in a top frame 12, as shown in FIG. 2, is provided to move the chains 9. The top frame 12 is supported on the four lifting units 3 and extends parallel to and spaced apart from the bearing surface 4. The drive 11 shown in FIG. 2 is configured as a hydraulic strut which is movable with a movement path of 1 meter to move the chain 9 in the pushing-in direction 6. For this purpose, the drive 11 is connected by means of a cable 13 to the chain 9, which cable 13 is deflected by means of an upper deflection roller 14.

The upper deflection roller 14 is provided opposite the lower deflection roller 10 at the upper end of the terminal of the respective lifting unit 3. A further cable 13 which is connected to a further chain 9 of the opposite lifting unit 3, not shown in FIG. 2, is deflected via a further upper deflection roller 13. Brackets 8 connected to one another of the oppositely arranged lifting units 3 can in such a manner be moved synchronously and parallel in relation to the base frame 2.

Insofar as the drive 11 is arranged within the base frame 2, the upper deflection roller 14 can deflect the cable in the direction of the base frame 2. The terminals of the lifting units 3 configured in a profile-like manner can be arranged rigidly on the base frame 2, namely, as shown in the figures, extend orthogonally to the bearing surface 4 away from it. The terminals or the lifting units 3 can likewise be arranged pivotably on the base frame 2.

The drive 11 can likewise be of a manual type in the case of which a handwheel with a crank is provided on each side of the base frame 2. A movement of the handwheel can be transmitted to a cable reel via a worm thread. The electromotive and/or hydraulic drive 11 described above can be supplemented by a battery.

Figure 3:
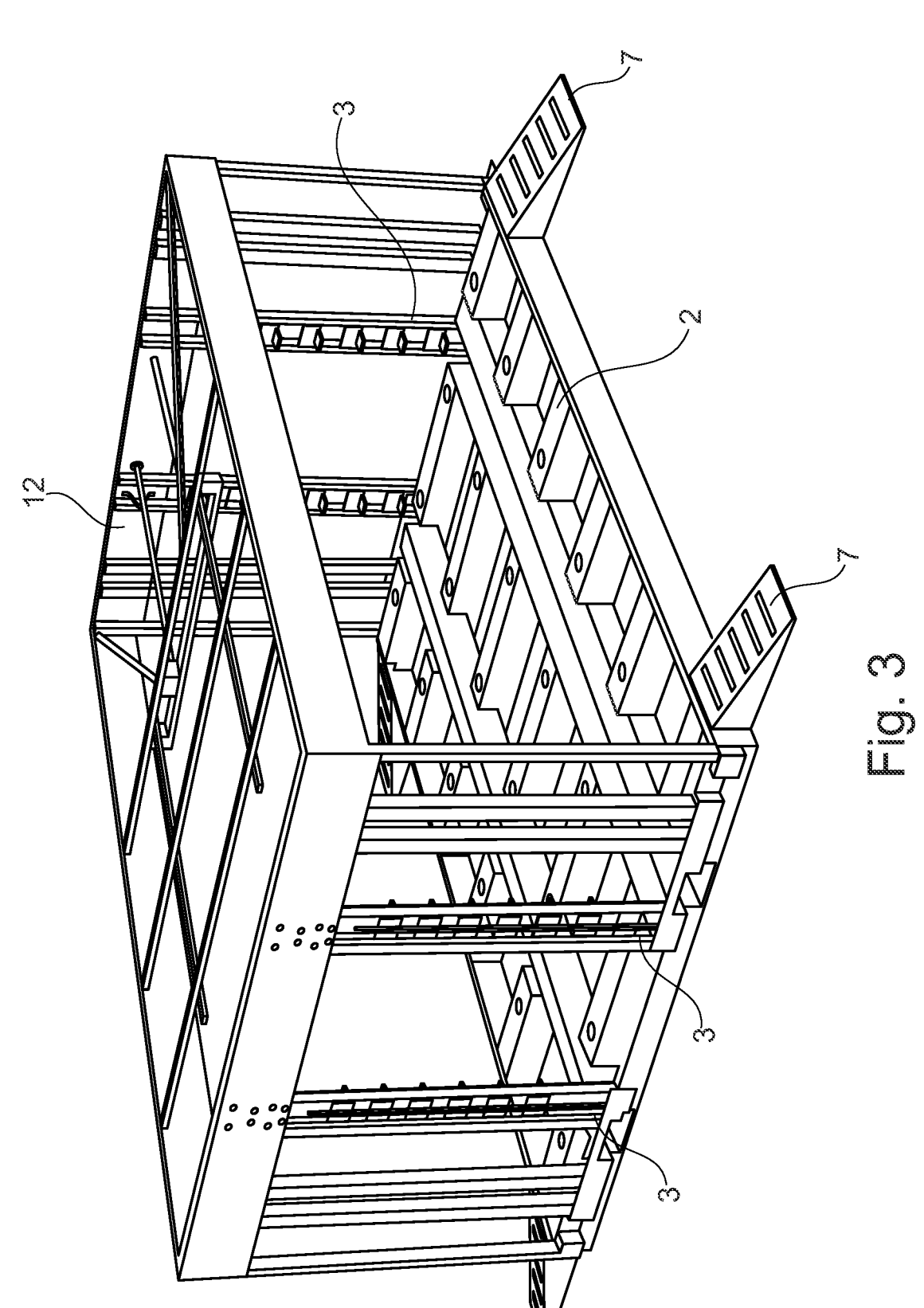
FIG. 3 shows the pallet transport means according to FIG. 1 in a perspective view according to a yet further preferred exemplary embodiment of the invention.

FIG. 3 shows a further configuration or the configuration of FIG. 2 in a perspective side view, in the case of which wall elements 15 composed of plexiglass are arranged circumferentially around the base frame 2. A transfer opening through which the pallets 1 can reach the base frame 2 is provided to load and unload the pallet transport means on a front side. The ramps 7 provided opposite on the front side are configured pivotably so that pallets 1 mounted on the brackets 8 cannot fall out of the pallet transport means as a result of closing the ramps 7 in the pallet transport means.

The described exemplary embodiments are merely examples which can be modified and/or supplemented in various ways in the scope of the claims. Each feature which was described for a specific exemplary embodiment can be used independently or in combination with other features in any desired other exemplary embodiment. Each feature which was described for an exemplary embodiment of a specific category can also be used in a corresponding manner in an exemplary embodiment of another category.

LIST OF REFERENCE NUMBERS

Pallet 1
Base frame 2
Lifting unit 3
Bearing surface 4
B all roller 5
Pushing-in direction 6
Ramp 7
Bracket 8
Chain 9
Lower deflection roller 10
Drive 11
Top frame 12
Cable 13
Upper deflection roller 14
Wall element 15

The invention claimed is:

1. Pallet transport means for transporting a plurality of pallets, the pallets being configured as Unit Load Device pallets or air cargo pallets, the pallet transport means comprising:

a base frame configured to receive the plurality of pallets, and at least two lifting units arranged oppositely on the base frame, wherein each lifting unit has a plurality of brackets which are connected to one another, wherein in an extended state the brackets are spaced apart to each other in a direction orthogonally to a base plate of the base frame, wherein the brackets are configured to receive in pairs in an opposite manner a pallet that is arranged parallel to the base plate of the base frame, and are further configured to move said received pallet orthogonally with respect to the base plate of the base frame, and wherein in a retracted state, the brackets are arranged below the base plate of the base frame and are movable parallel to the base plate of the base frame.

2. The pallet transport means according to claim 1, wherein each lifting unit has a chain hoist or a belt on which the brackets are provided, wherein the chain hoist or belt can be moved on one hand orthogonally and on the other hand parallel in relation to the base frame.

3. The pallet transport means according to claim 1, wherein the brackets within the base frame or within a top frame arranged orthogonally in relation to the base frame and spaced apart therefrom can be moved parallel in relation to the base frame.

4. The pallet transport means according to claim 1, further comprising an electromotive and/or hydraulic drive provided within the base frame or within a top frame arranged orthogonally in relation to the base frame and spaced apart therefrom, wherein the drive is configured to synchronously move the brackets connected to one another of the lifting units arranged oppositely.

5. The pallet transport means according to claim 1, wherein the base frame is configured to be rectangular and four lifting units are provided, wherein in each case two lifting units are arranged spaced apart on one side of the base frame.

6. The pallet transport means according to claim 1, wherein the lifting units are arranged pivotably on the base frame.

7. The pallet transport means according to claim 1, wherein the brackets are configured to engage under the respective pallet for movement thereof.

8. The pallet transport means according to claim 1, further comprising a plurality of rollers provided on the base frame, wherein via the rollers the respective pallet can be rolled onto the base frame.

9. An arrangement comprising the pallet transport means according to claim 1 and the plurality of pallets, wherein the pallets are received in each case by two brackets and are arranged orthogonally in relation to the base frame and spaced apart from one another.

10. The arrangement according to claim 9, wherein the pallets are configured in each case as the Unit Load Device pallets.

11. The arrangement according to claim 9, wherein the pallets correspond to the base frame in terms of their extent.

12. A method for transporting a plurality of pallets with a pallet transport means having a base frame configured for receiving the plurality of pallets, and at least two lifting units arranged oppositely on the base frame, wherein each lifting unit has a plurality of brackets which are connected to one another and the brackets are configured to receive in pairs in an opposite manner a pallet that is arranged parallel to a base plate of the base frame, the method comprising:

for orthogonal movement of the pallets within the pallet transport means, wherein the brackets are further configured to move said received pallet orthogonally with respect to the base plate of the base frame, wherein in an extended state the brackets are spaced apart to each other in a direction orthogonally to the base plate of the base frame, and wherein in a retracted state, the brackets are arranged below the base plate of the base frame and are movable parallel to the base plate of the base frame.

13. The method according to claim 12, further comprising:

pushing-in a pallet onto the base frame, moving the pallet orthogonally in relation to the base frame upwards away therefrom, pushing-in a further pallet onto the base frame, and moving the further pallet including the pallet already moved.

* * * * *